United States Patent
Jiang (10) Patent No.: US 7,911,531 B2
(45) Date of Patent: Mar. 22, 2011

(54) BATTERY, CAMERA AND CAMERA SYSTEM

(75) Inventor: Hua Jiang, Kawasaki (JP)

(73) Assignee: Nikon Corporation, Tokyo (JP)

( * ) Notice: Subject to any disclaimer, the term of this patent is extended or adjusted under 35 U.S.C. 154(b) by 875 days.

(21) Appl. No.: 10/995,366

(22) Filed: Nov. 24, 2004

(65) Prior Publication Data
US 2005/0117050 A1 Jun. 2, 2005

(30) Foreign Application Priority Data
Dec. 1, 2003 (JP) ................... 2003-401385

(51) Int. Cl.
*H04N 5/225* (2006.01)
(52) U.S. Cl. ........ 348/372; 455/573; 320/124; 320/127; 320/162; 320/163; 320/164
(58) Field of Classification Search .............. 348/372; 320/148–149, 156–159, 161–164
See application file for complete search history.

(56) References Cited

U.S. PATENT DOCUMENTS

| | | | | |
|---|---|---|---|---|
| 5,325,041 A | * | 6/1994 | Briggs ............................ | 320/149 |
| 5,606,242 A | * | 2/1997 | Hull et al. ....................... | 320/106 |
| 5,623,210 A | * | 4/1997 | Sakamoto ....................... | 324/426 |
| 5,627,453 A | * | 5/1997 | Sheehan et al. ................ | 320/134 |
| 5,784,105 A | * | 7/1998 | Kawamura ...................... | 348/372 |
| 5,955,869 A | * | 9/1999 | Rathmann ....................... | 320/132 |
| 5,963,017 A | * | 10/1999 | Yeh et al. ........................ | 320/132 |
| 6,008,620 A | * | 12/1999 | Nagano et al. ................. | 320/106 |
| 6,191,554 B1 | * | 2/2001 | Nakane et al. ................. | 320/114 |
| 6,522,361 B2 | | 2/2003 | Higuchi et al. | |
| 6,691,049 B1 | * | 2/2004 | Jeansonne et al. ............... | 702/63 |
| 6,903,778 B1 | * | 6/2005 | Kaku ............................ | 348/372 |
| 6,975,095 B2 | * | 12/2005 | Ooi et al. ....................... | 320/132 |
| 2001/0033331 A1 | * | 10/2001 | Eto et al. ........................ | 348/208 |

(Continued)

FOREIGN PATENT DOCUMENTS
JP U-3-63040 6/1991
(Continued)

OTHER PUBLICATIONS
Sep. 7, 2010 Office Action issued in Japanese Patent Application No. 2008-131071 (with translation).

*Primary Examiner* — Sinh Tran
*Assistant Examiner* — Anthony J Daniels
(74) *Attorney, Agent, or Firm* — Oliff & Berridge, PLC (57) ABSTRACT

A battery takes in a charge current value or a discharge current value from a current detection device at predetermined sampling intervals. Then, based upon the current value, a power consumption quantity representing the extent to which power has been consumed during a sampling interval is calculated and a total power consumption quantity is determined by sequentially adding the power consumption quantity corresponding to each sampling interval. Based upon the total power consumption quantity calculated at each sampling interval, a determination device determines as to whether or not the battery needs to be refreshed, and the determination results are transmitted to the camera. The camera informs the user that the battery needs to be refreshed if the determination device judges that a refresh operation is necessary. The sampling interval may be set longer when the power to the camera is in an OFF state compared to when the power to the camera is in an ON state.

4 Claims, 11 Drawing Sheets

U.S. PATENT DOCUMENTS

2002/0167293 A1* 11/2002 Ptasinski et al. ............... 320/132
2008/0055419 A1* 3/2008 Ito ........................... 348/207.99

FOREIGN PATENT DOCUMENTS

| JP | A 08-223812 | 8/1996 |
| JP | A 09-046916 | 2/1997 |
| JP | 09-297166 A | 11/1997 |
| JP | A 11-283677 | 10/1999 |
| JP | A 2001-210386 | 8/2001 |
| JP | A-2002-238176 | 8/2002 |
| JP | A 2003-031267 | 1/2003 |
| JP | A 2003-092839 | 3/2003 |

* cited by examiner

BATTERY, CAMERA AND CAMERA SYSTEM

INCORPORATION BY REFERENCE

The disclosure of the following priority application is herein incorporated by reference:

Japanese Patent Application No. 2003-401385 filed Dec. 1, 2003

BACKGROUND OF THE INVENTION

1. Field of the Invention

The present invention relates to a battery, a camera and a camera system, and in particular, it relates to a technology that provides a user with accurate information indicating whether or not the battery needs to be refreshed.

2. Description of the Related Art

Cameras and the like are normally equipped with a battery check function through which the voltage at the source battery is monitored over specific time intervals and different warning messages can be issued when the battery voltage becomes lower than one of several predetermined reference levels. The warning, which may indicate "sufficient battery power remaining", "remaining battery power low", "need to replace battery" or the like, may be displayed on, for instance, a liquid crystal display unit by using icons. Such a battery check function is provided simply for the purpose of prompting the photographer to replace the battery. Thus, the remaining battery power is not indicated with accuracy and the user is not provided with information indicating the precise number of pictures that can be taken, the precise length of time over which the camera can be operated or the like on the remaining battery power.

Japanese Laid Open Patent Publication No. H9-297166 discloses a method for indicating the remaining battery power. In this method, a current detector, a voltage detector and a communication circuit are included in a secondary battery pack, remaining battery power information, charge/discharge current detection information and battery cell voltage detection information originating in the battery pack are received at an electronic device (such as a video camera) and the level of the currently available battery power is calculated and indicated based upon the received information. Compared to the battery check described earlier, the remaining battery power can be ascertained with a higher degree of accuracy and the length of time over which the camera can be operated or the like can be accurately indicated to the user by adopting this method.

However, the absolute capacity of a secondary battery is bound to become lower after repeated use under normal circumstances. For this reason, the older the battery becomes, the greater the deviation of its actual absolute capacity relative to the absolute capacity recognized by the electronic device, and the remaining battery power can no longer be determined accurately through the method described above. In order to eliminate such a deviation, the battery needs to undergo a so-called refresh (calibration) operation through which it is completely discharged. The charge quantity of a battery that has been first refreshed and then fully charged equals the absolute capacity of the battery. While chargers with a refresh function have become available for practical applications in recent years, it takes a long time to perform a single refresh operation (normally longer than a charge operation), and having to perform a refresh operation frequently is bound to inconvenience the user. This problem may be adequately addressed with a function that provides the user with accurate information indicating whether or not the battery needs to be refreshed.

SUMMARY OF THE INVENTION

A battery loaded in a camera according to a first aspect of the present invention comprises a current detection device; an arithmetic operation device that receives one of a charge current value and a discharge current value from the current detection device at predetermined sampling intervals, calculates a power consumption quantity indicating an extent to which power has been consumed during a sampling interval based upon the current value and calculates a total power consumption quantity by sequentially adding the power consumption quantity consumed during each sampling interval; a determination device that determines as to whether the battery needs to be refreshed based upon the total power consumption quantity calculated at each sampling interval; and a communication device that transmits determination results by the determination device to the camera.

A battery loaded in a camera according to a second aspect of the present invention comprises a current detection device; an arithmetic operation device that receives one of a charge current value and a discharge current value from the current detection device at predetermined sampling intervals, calculates a power consumption quantity indicating an extent to which power has been consumed during a sampling interval based upon the current value and calculates a total power consumption quantity by sequentially adding the power consumption quantity consumed during each sampling interval; and a communication device that transmits the calculated total power consumption quantity to the camera.

In battery according to the first or the second aspect, the arithmetic operation device sets the sampling interval longer when power to the camera is in an OFF state compared to when the power to the camera is in an ON state.

A camera according to a third aspect of the present invention comprises a determination device that determines as to whether a battery loaded therein needs to be refreshed by comparing a total battery power consumption quantity transmitted from the battery with a predetermined threshold value; and an informing device that informs a user that the battery needs to be refreshed if the determination device determines that a refresh operation is necessary.

A camera according to a forth aspect of the present invention comprises an arithmetic operation device that calculates a power consumption quantity indicating an extent to which power has been consumed during a sampling interval based upon a discharge current value transmitted from a battery loaded therein at predetermined sampling intervals and calculates a total power consumption quantity by sequentially adding up the power consumption quantity consumed during each sampling interval; a determination device that determines as to whether the battery needs to be refreshed based upon the total power consumption quantity calculated at each sampling interval; and an informing device that informs a user that the battery needs to be refreshed if the determination device determines that a refresh operation is necessary.

In a camera according to the forth aspect, the arithmetic operation device sets the sampling interval longer when power to the camera is in an OFF state compared to when the power to the camera is in an ON state.

A camera system constituted of a camera and a battery loaded in the camera according to a fifth aspect of the present invention comprises a current detection device; an arithmetic operation device that receives one of a charge current value and a discharge current value from the current detection device at predetermined sampling intervals, calculates a power consumption quantity indicating an extent to which power has been consumed during a sampling interval based upon the current value and calculates a total power consumption quantity by sequentially adding the power consumption quantity consumed during each sampling interval; a determination device that determines as to whether the battery needs to be refreshed based upon the total power consumption quantity calculated at each sampling interval; and an informing device that informs a user that the battery needs to be refreshed if the determination device determines that a refresh operation is necessary.

In a camera system according to the fifth aspect, the arithmetic operation device sets the sampling interval longer when power to the camera is in an OFF state compared to when the power to the camera is in an ON state.

A battery according to a sixth aspect of the present invention comprises, a current detection device; an arithmetic operation device that receives one of a charge current value and a discharge current value from the current detection device at predetermined sampling intervals, calculates a power consumption quantity indicating an extent to which power has been consumed during a sampling interval based upon the current value and calculates a total power consumption quantity by sequentially adding the power consumption quantity consumed during each sampling interval; a determination device that determines as to whether the battery needs to be refreshed based upon the total power consumption quantity calculated at each sampling interval; and a communication device that transmits determination results by the determination device to the outside.

A battery according to a seventh aspect of the present invention comprises a current detection device; an arithmetic operation device that receives one of a charge current value and a discharge current value from the current detection device at predetermined sampling intervals, calculates a power consumption quantity indicating an extent to which power has been consumed during a sampling interval based upon the current value and calculates a total power consumption quantity by sequentially adding the power consumption quantity consumed during each sampling interval; and a communication device that transmits the calculated total power consumption quantity to outside.

A portable electronic device according to a eighth aspect of the present invention comprises a determination device that determines as to whether a battery loaded therein needs to be refreshed by comparing a total battery power consumption quantity transmitted from the battery with a predetermined threshold value; and an informing device that informs a user that the battery needs to be refreshed if the determination device determines that a refresh operation is necessary.

A portable electronic device according to a ninth aspect of the present invention comprises an arithmetic operation device that calculates a power consumption quantity indicating an extent to which power has been consumed during a sampling interval based upon a discharge current value transmitted from a battery loaded therein at predetermined sampling intervals and calculates a total power consumption quantity by sequentially adding up the power consumption quantity consumed during each sampling interval; a determination device that determines as to whether the battery needs to be refreshed based upon the total power consumption quantity calculated at each sampling interval; and an informing device that informs a user that the battery needs to be refreshed if the determination device determines that a refresh operation is necessary.

A system constituted of a portable electronic device and a battery loaded in the portable electronic device according to a tenth aspect of the present invention comprises a current detection device; an arithmetic operation device that receives one of a charge current value and a discharge current value from the current detection device at predetermined sampling intervals, calculates a power consumption quantity indicating an extent to which power has been consumed during a sampling interval based upon the current value and calculates a total power consumption quantity by sequentially adding the power consumption quantity consumed during each sampling interval; a determination device that determines as to whether the battery needs to be refreshed based upon the total power consumption quantity calculated at each sampling interval; and an informing device that informs a user that the battery needs to be refreshed if the determination device determines that a refresh operation is necessary.

DESCRIPTION OF THE PREFERRED EMBODIMENT

An embodiment of the present invention is explained in reference to FIGS. 1 through 7.

Figure 1:
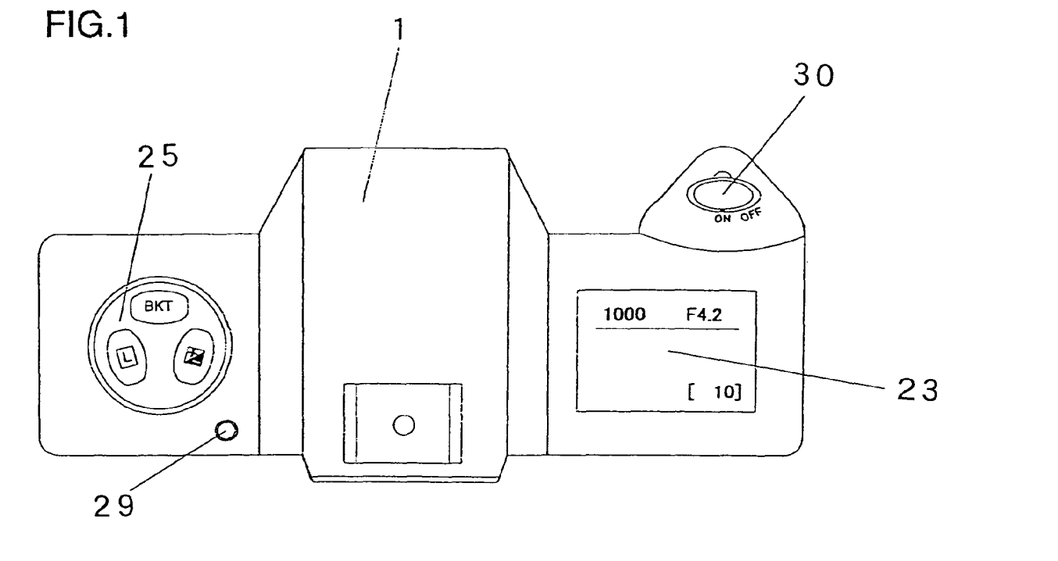
FIG. 1 is a top view of a camera achieved in an embodiment.

FIG. 1 is a top view of a camera achieved in the embodiment. A main switch 30 operated to turn on/off the power, a liquid crystal display unit 23 at which various types of information are displayed, an information setting circuit 25 constituted with various operating switches and an LED 29 that indicates a refresh request are disposed at the top surface of the camera 1. As the LED 29 becomes lit or flashes, the user is prompted to refresh the battery.

Figure 2:
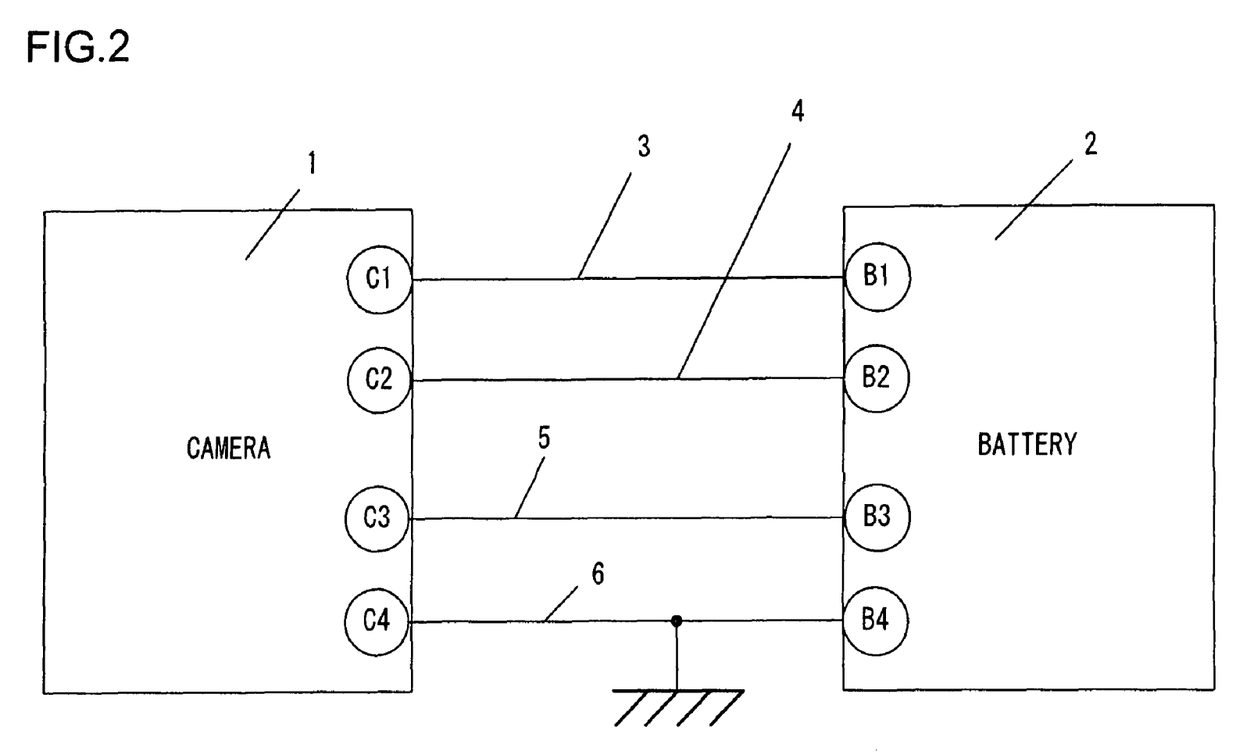
FIG. 2 shows lines connecting the camera and a battery.

The camera 1 is supplied with power from a dedicated battery (battery pack) 2 shown in FIG. 2. The battery 2, which includes built-in secondary battery cells such as, for instance, lithium-ion cells, can be charged and refreshed with a charger (not shown).

The absolute capacity of a secondary battery is bound to become lower after repeated use under normal circumstances and, for this reason, the older the battery becomes, the greater the deviation of its actual absolute capacity relative to the absolute capacity recognized by the electronic device, such as a camera. In order to eliminate such a deviation, the battery needs to undergo a so-called refresh (calibration) operation through which it is completely discharged. The charge quantity of a battery that has been first refreshed and then fully charged equals the absolute capacity of the battery.

As the battery 2 is loaded into the camera 1, terminals C1 to C4 at the camera become electrically connected with terminals B1 to B4 respectively on the battery side, and a communication line 3 connecting the terminals C1 and B1, a load recognition line 4 connecting the terminals C2 and B2, a power positive line 5 connecting the terminals C3 and B3 and a power negative line 6 connecting the terminals C4 and B4 are established, as shown in FIG. 2. The voltage at the power negative line 6 indicates a reference level for all the circuits in the camera 1 and the battery 2.

Figure 3:
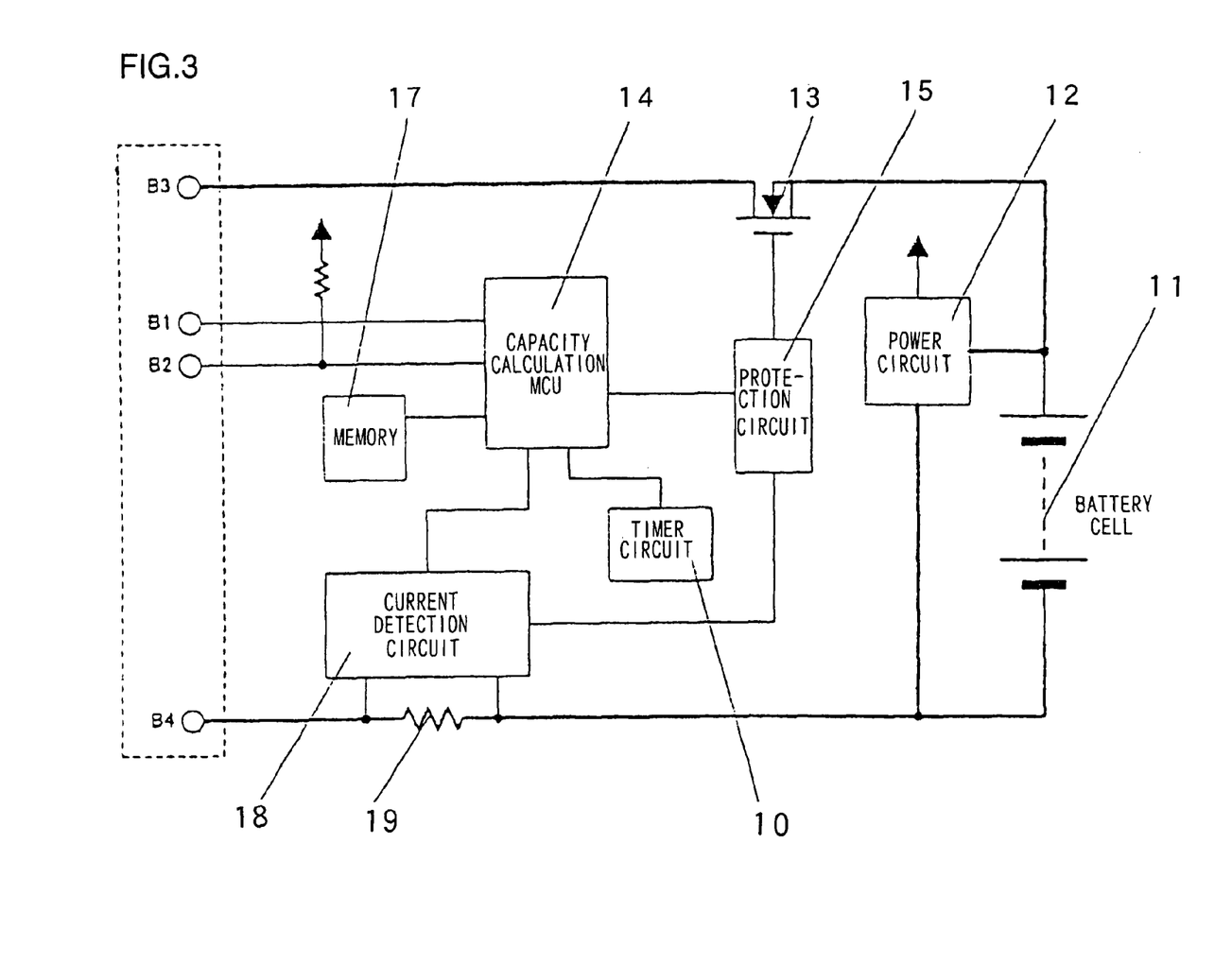
FIG. 3 is a block diagram showing the structure adopted in the battery.

FIG. 3 is a block diagram of the battery 2. The battery 2 is constituted with battery cells 11 and a control circuit unit. The control circuit unit includes a timer circuit 10, a power circuit 12, a capacity calculation MCU 14, a current detection circuit 18, a battery protection circuit 15, a memory 17 and the like. The power circuit 12 converts the voltage input from the battery cells 11 to a voltage achieving a circuit operation level and supplies the power to the individual circuits. The capacity calculation MCU 14, which has a timer function, monitors and controls all the circuit operations within the battery 2 and also engages in communication with the camera 1 via the communication line 3. The current detection circuit 18 monitors the charge/discharge current flowing through a sense resistor 19 and provides the detected current value to the capacity calculation MCU 14. The capacity calculation MCU 14 reads the output from the current detection circuit 18 at predetermined sampling intervals and calculates a value representing the power consumption as detailed later.

The protection circuit 15 turns off a MOS 13 when an abnormal current is detected by the current detection circuit 18 or when an output cutoff control signal is issued from the capacity calculation MCU 14 so as to forcibly cut off the current supply. Various types of information indicating the battery capacity, the power consumption and the like are stored in the memory 17, and the information stored in the memory 17 is provided to the capacity calculation MCU 14 as necessary. The timer circuit 10 executes a time count in response to an instruction issued by the capacity calculation MCU 14.

Figure 4:
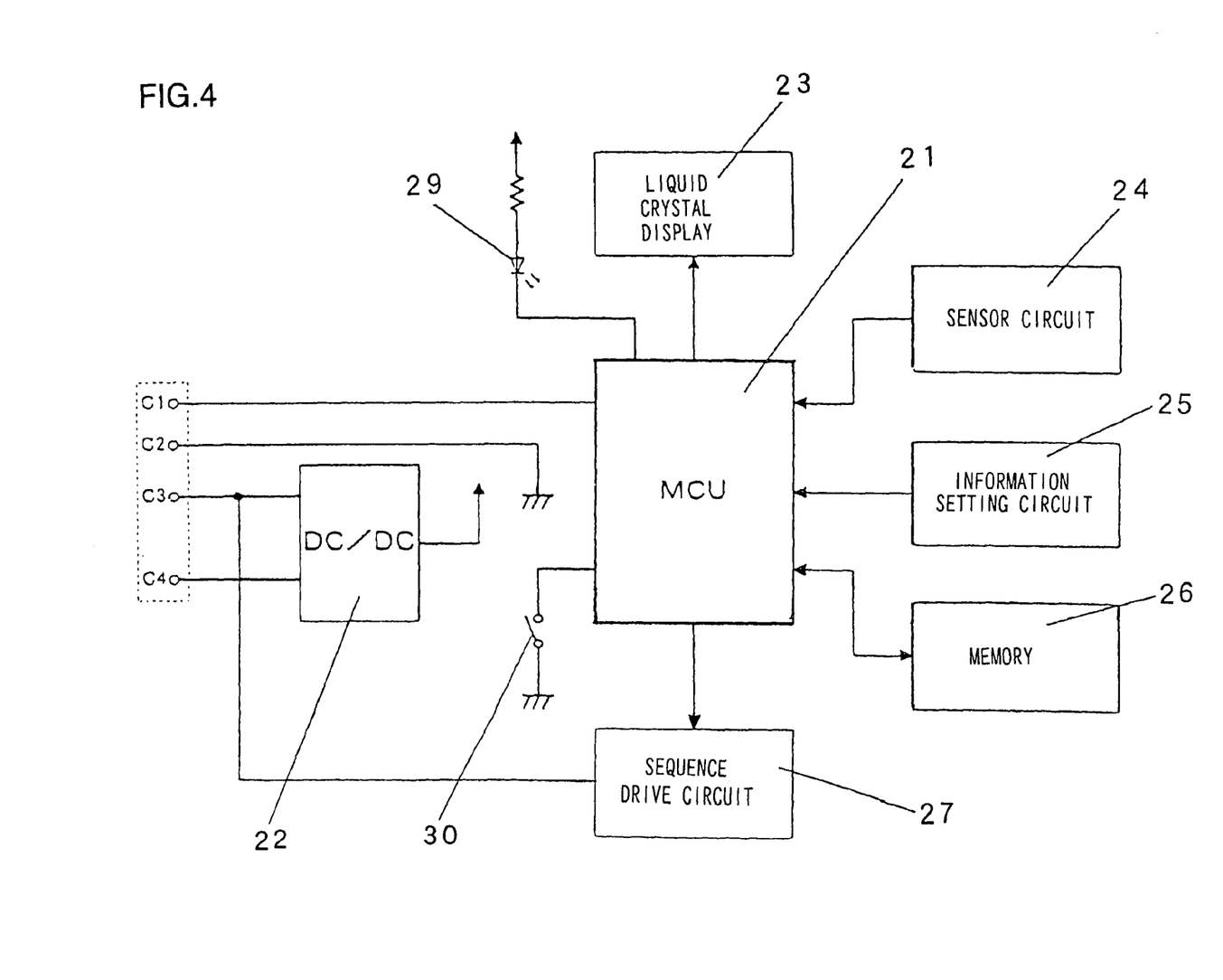
FIG. 4 is a block diagram showing the structure adopted in the camera.

FIG. 4 is a block diagram of the camera 1. The power supplied through the power positive/negative lines 5 and 6 is used to execute the photographing sequence and is also adjusted at the DC/DC converter 22 to achieve a voltage level needed for the various operating circuits in the camera. A camera MCU 21 that controls all the operations executed in the camera 1 is connected with the main switch 30, the information setting circuit 25, the liquid crystal display unit 23 and the refresh warning LED 29 explained earlier, and is also connected with a sensor circuit 24, a memory 26 and a sequence drive circuit 27.

The sensor circuit 24 includes a photometering circuit that detects the brightness of the subject and a focal point detection circuit that detects a focus adjustment state. Various types of information are stored in the memory 26, and the information stored in the memory 26 is provided to the camera MCU 21 as necessary. The camera MCU 21 engages in operation in response to the operations of the various switches constituting the information setting circuit 25. For instance, as a shutter release switch enters an ON state, the camera MCU 21 outputs a sequence signal to the sequence drive circuit 27, and upon receiving the sequence signal, the sequence drive circuit 27 drives actuators such as a motor and magnet to execute the photographing sequence.

Next, the operation that characterizes the embodiment, i.e., the operation through which a battery refresh request is generated, is explained.

The capacity calculation MCU 14 in the battery 2 calculates the extent of power consumption in the battery at predetermined intervals of T and makes a decision as to whether or not the battery 2 needs to be refreshed. Generally speaking, the capacity of a battery becomes lowered once the extent of battery consumption exceeds a predetermined level. Accordingly, the decision as to whether or not the battery 2 needs to be refreshed can be made by determining a power consumption quantity Wtt1 indicating the extent to which power has been consumed since the start of battery use or since the most recent refresh operation and then comparing the power consumption quantity Wtt1 with a predetermined threshold value Wpre (e.g., 40,000 mAh). Since the power consumption quantity at which the capacity becomes lowered varies among various types of batteries, the threshold value Wpre is set in advance in correspondence to each battery type and is stored in the memory 17.

The following is an explanation of a specific method of arithmetic operation that may be adopted when judging whether or not a refresh operation is necessary. In each sampling interval, a discharge current value Inow at the present time point is obtained from the current detection circuit 18. Then, a power consumption quantity Wnow consumed during each sampling interval T is calculated as expressed in (1) below.

$$Wnow = Inow \times T \quad (1)$$

Then, a total power consumption quantity Wtt1 is calculated as expressed in (2) below.

$$Wtt1 = Wtt1 + Wnow \quad (2)$$

As indicated in expression (2), the value of Wtt1 is updated by sequentially adding Wnow to the previous total power consumption quantity Wtt1. The value of Wtt1 thus calculated is equivalent to the total power consumption quantity representing the extent to which power has been consumed since the start of the battery use or since the previous refresh operation up to the specific sampling time point. Each time the value of Wtt1 is updated, the updated Wtt1 is compared with the threshold value Wpre. If the updated Wtt1 is equal to or greater than the threshold value Wpre, it is judged that the battery 2 needs to be refreshed and, accordingly, a refresh request is issued to the camera 1.

Upon receiving a refresh request through communication with the battery 2, the camera MCU 21 lights or flashes (blinks on and off) the LED 29 to prompt the user to refresh the battery 2. Verifying the operation at the LED 29, the user loads the battery 2 onto the charger (not shown) for a refresh operation. The refresh operation can normally be started by pressing a specific button. Once the refresh operation is completed, information indicating the completion of the refresh operation is output from the charger to the battery 2, and in response, the capacity calculation MCU 14 resets the total power consumption quantity Wtt1. When the user subsequently charges the battery 2 to its full capacity, the charge quantity achieved through the full charge is stored in memory in the battery 2 as the absolute capacity of the battery. As the battery 2 is reloaded into the camera 1, the absolute capacity can be ascertained in the camera 1 as well and thus, the battery power remaining in the battery 2, the number of pictures that can be taken on the remaining power and the like can be determined through arithmetic operations and can be accurately indicated in the camera 1.

It is to be noted that the decision as to whether or not the battery needs to be refreshed may instead be made by counting the number of times the battery 2 is charged to a level equal to or exceeding a predetermined level and judging that the battery 2 needs to be refreshed once the count becomes equal to a predetermined value. However, since the battery 2 may be charged to achieve varying charge quantities through individual charges, the total power consumption quantity cannot be accurately estimated simply based upon the number of charge operations and, for this reason, the refresh request may not be issued with optimal timing. For instance, the user may frequently charge the battery 2 which has been used only slightly before it becomes depleted. In such a case, the refresh request would be issued with unnecessary frequency to result in an excessive onus placed on the user. However, in the method achieved in the embodiment described above, the total power consumption quantity Wtt1 is updated by ascertaining the power consumption quantity Wnow and a decision is made as to whether or not the battery 2 needs to be refreshed based upon the value of Wtt1 after each time interval T. As a result, the refresh request is issued only if a refresh operation is truly necessary, regardless of how the particular user uses the battery 2.

The battery power is consumed while the main switch 30 of the camera 1 is in an OFF state as well as when the main switch 30 is in an ON state. Accordingly, the capacity calculation MCU 14 repeatedly calculates the value of Wtt1 as described above and makes a decision as to whether or not the battery 2 needs to be refreshed based upon the value of Wtt1 thus calculated, regardless of whether the main switch 30 is in an ON state or in an OFF state. However, the sampling interval T is adjusted depending upon whether the main switch 30 is in an ON state or in an OFF state. Namely, when the main switch 30 is in an ON state, the camera 1 executes various operations by driving a plurality of electric actuators with varying timing and thus, the value of the discharge current changes greatly over time. For this reason, unless the arithmetic operation is executed frequently at short sampling intervals of T, an accurate total power consumption quantity cannot be determined. When the main switch 30 is in an OFF state, on the other hand, the camera 1 engages in hardly any operation, and for this reason, the current value does not change greatly over time. Accordingly, the arithmetic operation can be executed at considerably longer sampling intervals of T.

Taking into consideration the point discussed above, the sampling interval T is set to;
T=Ton (approximately several ms)
when the main switch is in an ON state in the embodiment. However, if the main switch is in an OFF state, the sampling interval T is set to;
T=Toff (approximately 1 to 2 seconds).
By setting Toff to a much larger value than Ton, the number of times the arithmetic operation is executed when the main switch is in an OFF state is minimized to reduce the power consumption.

While the control described above is executed on the premise that the battery 2 is loaded in the camera 1, the battery 2 will discharge itself to a slight extent even after it is disengaged from the camera 1 and is left by itself (in a standby state). Since it is conceivable that the battery 2 may be stored by itself over an extended period of time, the total power consumption quantity needs to be determined by taking into consideration the power consumption quantity Q_wait representing the extent of power consumption through this self discharge. Since a self-consumption current value Iwait of the battery in the standby state can be regarded to remain substantially constant at all times, the self power consumption quantity Q_wait may be calculated as expressed in (3) below.

$$Q\_wait = Iwait \times Twait \quad (3),$$

with Twait representing the length of time over which the battery remains in the standby state.

A self-consumption current value Iwait may be stored in advance in the memory 17, and the length of standby time Twait may be measured with a timer. Then, an accurate total power consumption quantity can be determined by adding the value of the self power consumption quantity Q_wait to the value of Wtt1 every time the value of the self power consumption quantity Q_wait is ascertained.

Figure 5:
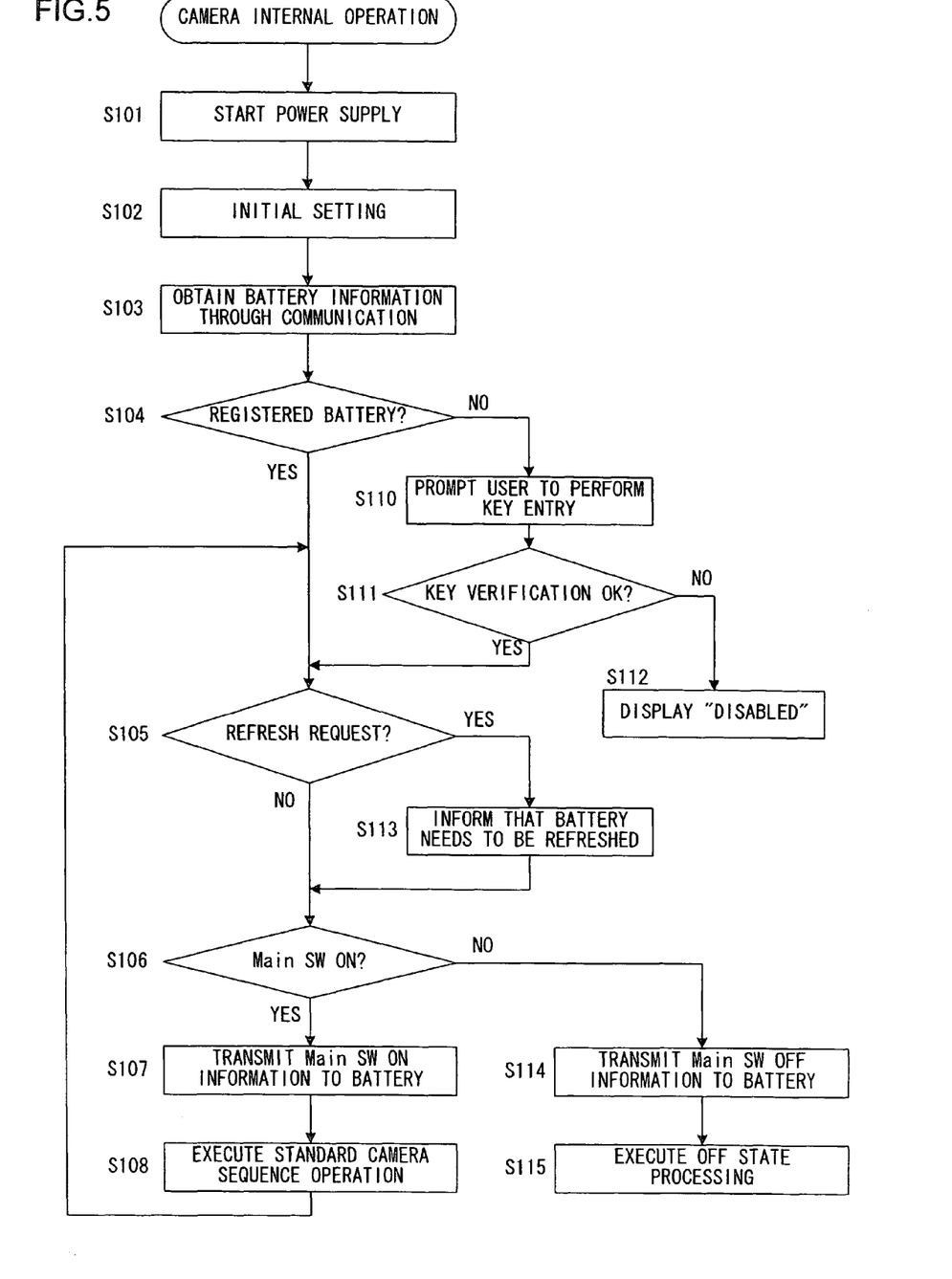
FIG. 5 presents a flowchart of the control procedure executed on the camera side.
Figure 6:
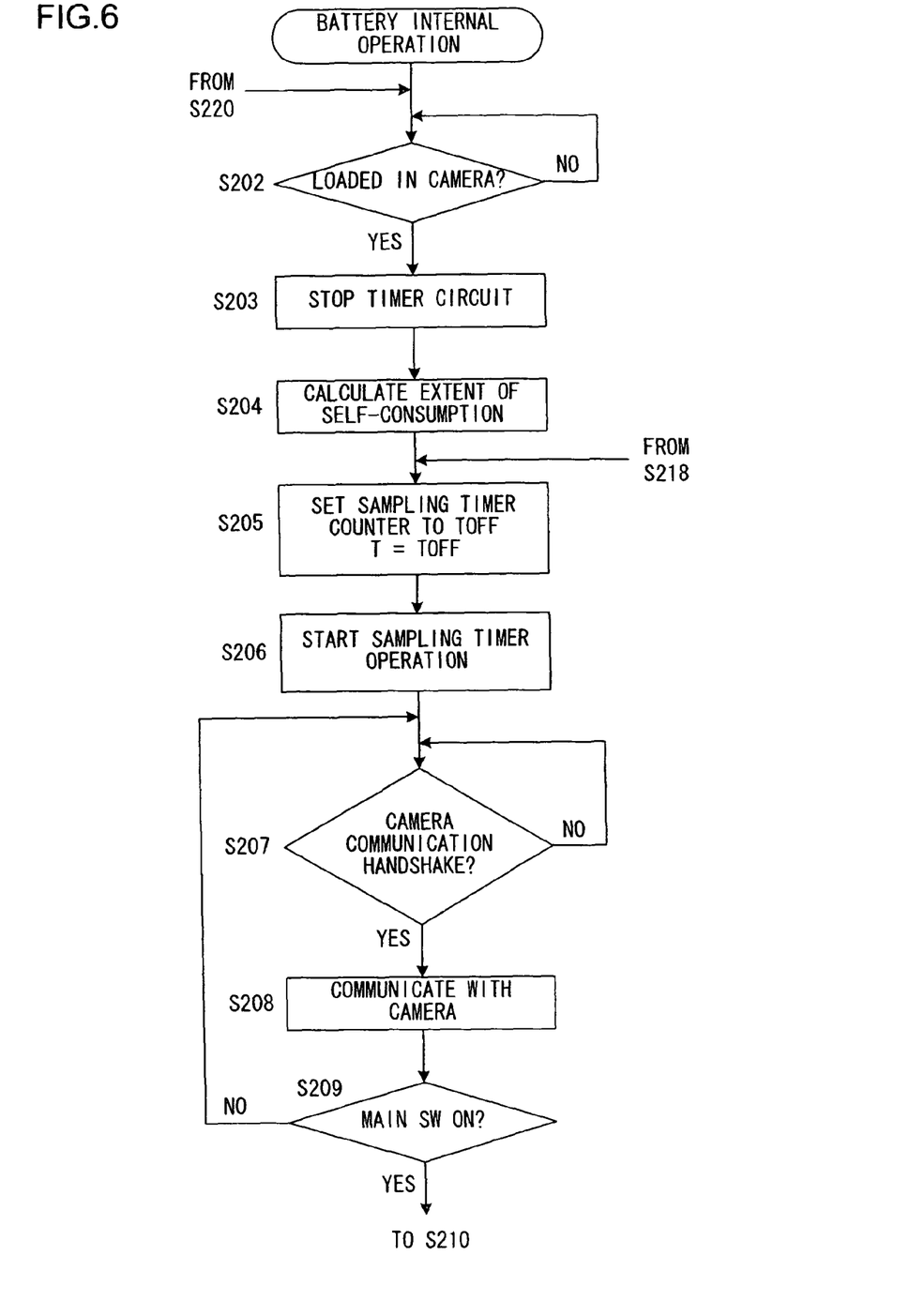
FIG. 6 presents a flowchart of the control procedure executed on the battery side.
Figure 7:
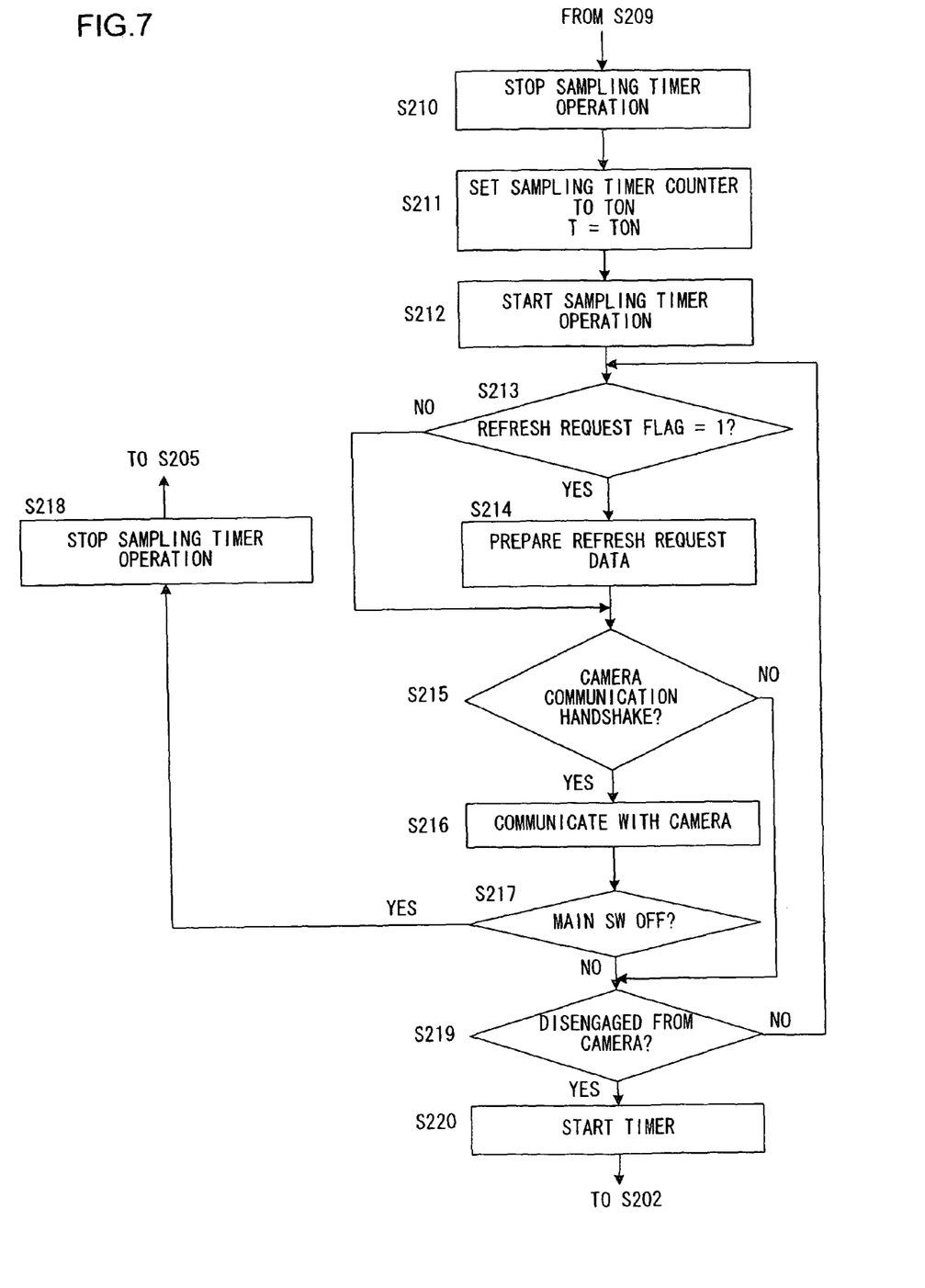
FIG. 7 presents the rest of the flowchart of the control procedure executed on the battery side in continuation from FIG. 6.
Figure 8:
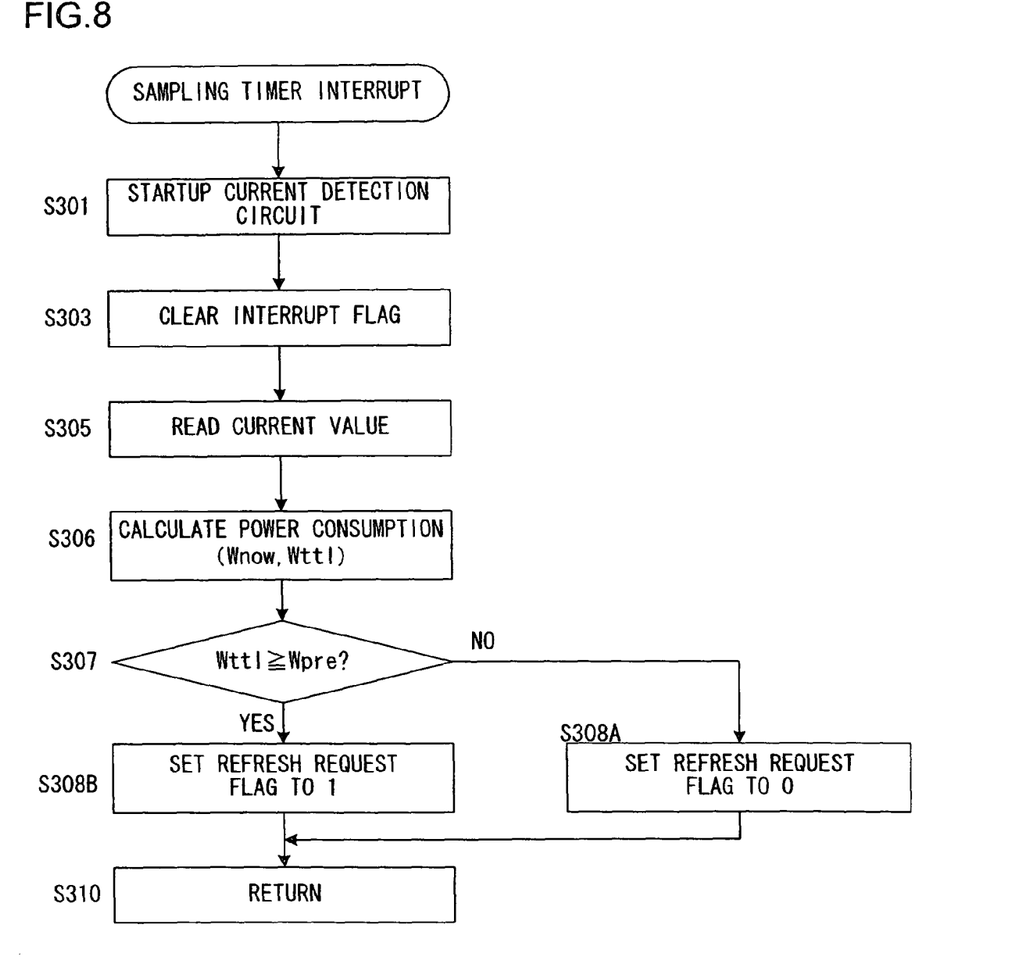
FIG. 8 presents a flowchart of the interrupt processing related to the decision made with regard to whether or not a refresh operation is necessary, which is part of the control procedure executed on the battery side.

FIGS. 5 through 8 present an example of processing executed to implement the control described above. FIG. 5 presents a flowchart of the control processing executed on the camera side, whereas FIGS. 6 through 8 present flowcharts of the control processing executed on the battery side.

First, the camera processing is explained in reference to FIG. 5. The power supply starts as the battery 2 is loaded into the camera 1 (step S101), and the camera MCU 21 is initialized to enter a normal operation enabled state (step S102).

The camera MCU 21 engages in communication with the battery 2 in step S103 to obtain the initial information with regard to the battery 2 and thus acquires several types of battery information. The information thus obtained includes the serial number (SN) of the battery 2. In step S104, the serial number thus obtained is referenced against the serial numbers registered in the memory 17. If it is decided that the battery 2 is a preregistered battery based upon the referencing results, the operation proceeds to step S105. If, on the other hand, the loaded battery is not a registered battery, the user is prompted to perform a key entry in step S110.

As the user performs a key entry in response to the prompt provided by the camera 1, a key verification is executed in step S111. If the verification results indicate that the information having been entered conforms to a specific rule, the battery is recognized as a compliant battery and the battery 2 is registered as such before the operation proceeds to step S105. If the entered information does not conform to the specific rule, the battery is recognized as an illegal battery and, in such a case, a message indicating that its use is disallowed is displayed at the liquid crystal display unit 23 in step S112 to disable any subsequent camera operation.

In step S105, a decision is made as to whether or not a refresh request has been issued. Information indicating the presence/absence of a refresh request is included in the battery information having been obtained in step S103. If a refresh request has been issued, the LED 29 is made to flash in step S113 thereby prompting the user to refresh the battery, before the operation proceeds to step S106. If a refresh request has not been issued, the operation proceeds to step S106 with the LED 29 left in an unlit state.

In step S106, a decision is made as to whether the main switch 30 is in an ON state or in an OFF state, and if the main switch 30 is determined to be in an ON state, information indicating that the main switch 30 is in an ON state is transmitted to the battery 2 in step S107. Subsequently, the processing shifts into the regular camera operation (step S108) during which various switch operations performed by the user are received and, in response to the specific switch operations, a mode setting is made, the photographing sequence is executed and necessary information is displayed at the liquid crystal display unit 23. If the main switch 30 is determined to be in an OFF state, on the other hand, information indicating that the main switch 30 is in an OFF state is transmitted to the battery 2 in step S114 and then off-state processing is executed in step S115. Through the off-state processing, information corresponding to the OFF state is displayed at the liquid crystal display unit 23, the LED 29 is turned off and lastly, the power to the camera MCU 21 itself is turned off before the operation is terminated.

Next, the processing executed in the battery 2 is explained in reference to FIGS. 6 through 8.

The capacity calculation MCU 14 in the battery 2 waits in standby until the battery 2 becomes loaded into the camera 1 (step S202), and once the battery 2 is loaded into the camera, it executes processing in step S203 and subsequent steps. The presence/absence of the battery 2 in the camera can be ascertained by continuously monitoring the state of the terminal B2. It is judged that the battery 2 is not loaded if the terminal B2 remains at high level, whereas it is judged that the battery 2 has been loaded once the terminal B2 shifts to low level.

In step S203, the time count by the timer circuit 10 is stopped. This time count is started in step S220 as described in detail later when the battery 2 is unloaded from the camera 1. Accordingly, the time count up to this time point is equivalent to the standby time Twait over which the battery remains in the standby state explained earlier. With the value of Twait thus obtained, the self power consumption quantity Q_wait over the standby time is calculated as expressed in (3) presented earlier in step S204 and the calculated self power consumption quantity Q_wait is added to the total power consumption quantity Wtt1.

Next, the value Toff to be selected when the main switch is in an OFF state, as explained earlier, is set at the sampling timer counter and also, the sampling interval T is set to Toff in preparation for the subsequent arithmetic operation in step S205. In step S206 an interrupt port is set at the capacity calculation MCU 14, thereby achieving a state in which an interrupt from the timer circuit 10 can be accepted, and then the timer is started. As a result, the timer circuit 10 outputs an interrupt signal to the MCU port after each time interval Toff.

In step S207, the operation waits for a communication handshake initiated by the camera 1 by monitoring the terminal B1. Once the communication handshake is detected, the battery 2 engages in communication with the camera 1 in step S208 to receive the information provided by the camera 1 and also to transmit the necessary information to the camera 1. In step S209, a decision is made as to whether the main switch 30 at the camera 1 is in an ON state or in an OFF state based upon the received information. If the main switch 30 is determined to be in an OFF state, the operation returns to step S207 to wait for the next communication handshake.

The interrupt signal is generated after each time interval Toff even while the processing in steps S207 through S209 is repeatedly executed, and each time the interrupt signal is generated, the interrupt processing shown in FIG. 8 is executed. The interrupt processing, which is executed to determine whether or not a refresh operation is necessary by ascertaining the power consumption quantity indicating the extent to which power has been consumed in the battery 2, is to be described in detail later.

If it is decided in step S209 that the main switch 30 in the camera 1 has been turned on, the operation of the sampling timer is stopped in step S210 (see FIG. 7). In step S211, the value Ton, which is the sampling interval selected when the main switch is in an ON state is set at the sampling timer counter and also, the sampling interval T is set to Ton in preparation for the subsequent arithmetic operation. In step S212, the timer is started. In response, the timer 10 outputs an interrupt signal to the port at the capacity calculation MCU 14 at the time intervals of Ton.

In step S213, the contents of a refresh request flag which is set through the interrupt processing detailed later are checked. If the refresh request flag is set to "1", a refresh request that is to be transmitted to the camera 1 through the next communication is prepared in step S214. If, on the other hand, the refresh request flag is set to "0", the operation skips step S214 to proceed to step S215.

In step S215, a decision is made as to whether or not a communication handshake has been initiated by the camera 1 by monitoring the terminal B1. The operation proceeds to step S219 if a communication handshake has not been initiated. If a communication handshake has been initiated, the operation proceeds to step S216 to receive the information from the camera 1 and to transmit the necessary information to the camera 1 through communication with the camera 1. In step S217, a decision is made as to whether the main switch 30 at the camera 1 is in an ON state or an OFF state based upon the received information.

If the main switch 30 at the camera has been turned off, the operation proceeds to step S218 to stop the sampling timer operation, and then the operation proceeds to step S205 (see FIG. 6). If, on the other hand, the main switch 30 is still in an ON state, the operation proceeds to step S219 to make a decision as to whether or not the battery 2 has been unloaded from the camera 1 by checking the terminal B2. If the terminal B2 is at low level, it is judged that the battery 2 is still loaded in the camera 1 and the operation returns to step S213. If the terminal B2 is at high level, it is judged that the battery 2 has been disengaged from the camera 1 and in this case, the operation proceeds to step S220. After starting up the timer to measure the standby period Twait for the battery 2 in steps S220, the operation returns to step S202 (see FIG. 6) to wait for the battery 2 to be loaded into the camera 1.

Next, in reference to FIG. 8, the interrupt processing executed by the capacity calculation MCU 14 is explained in detail. The processing is started up on a regular basis at intervals of Ton or Toff, thereby making a decision as to whether or not the battery 2 needs to be refreshed by determining the extent to which battery power has been consumed as described above.

In steps S301, the current detection circuit 18 is started up to detect the value of the current flowing through the sense resistor 19. In step S303, an interrupt flag is cleared in preparation for the next sampling. In step S305, the detection value provided by the current detection circuit 18 is obtained and the obtained detection value is designated as the current value Inow. In step S306, the power consumption quantity Wnow during a sampling interval T is calculated as indicated in expression (1) and the total power consumption quantity Wtt1 is calculated as indicated in expression (2).

The sampling interval T used in expression (1) is either Ton or Toff, as explained earlier.

The value of Wtt1 having been updated in step S306 as described above is compared with the threshold value Wpre in step S307. If Wtt1 is smaller than Wpre, the refresh request flag is set to "0" in step S308A. If, on the other hand, Wtt1 is equal to or larger than Wpre, the refresh request flag is set to "1" in step S308B. Then, the operation makes a return in step S310.

In the example explained above, the total power consumption quantity Wtt1 is calculated in the battery 2 and a decision is made as to whether or not a refresh operation is necessary based upon the calculated total power consumption value in the battery 2. Then the results of the decision are transmitted from the battery 2 to the camera 1. However, the total power consumption value Wtt1 calculated in the battery 2 may be transmitted to the camera 1 and the total power consumption quantity Wtt1 may be compared with the threshold value Wpre to judge whether or not a refresh operation is necessary on the camera side, instead.

Figure 9:
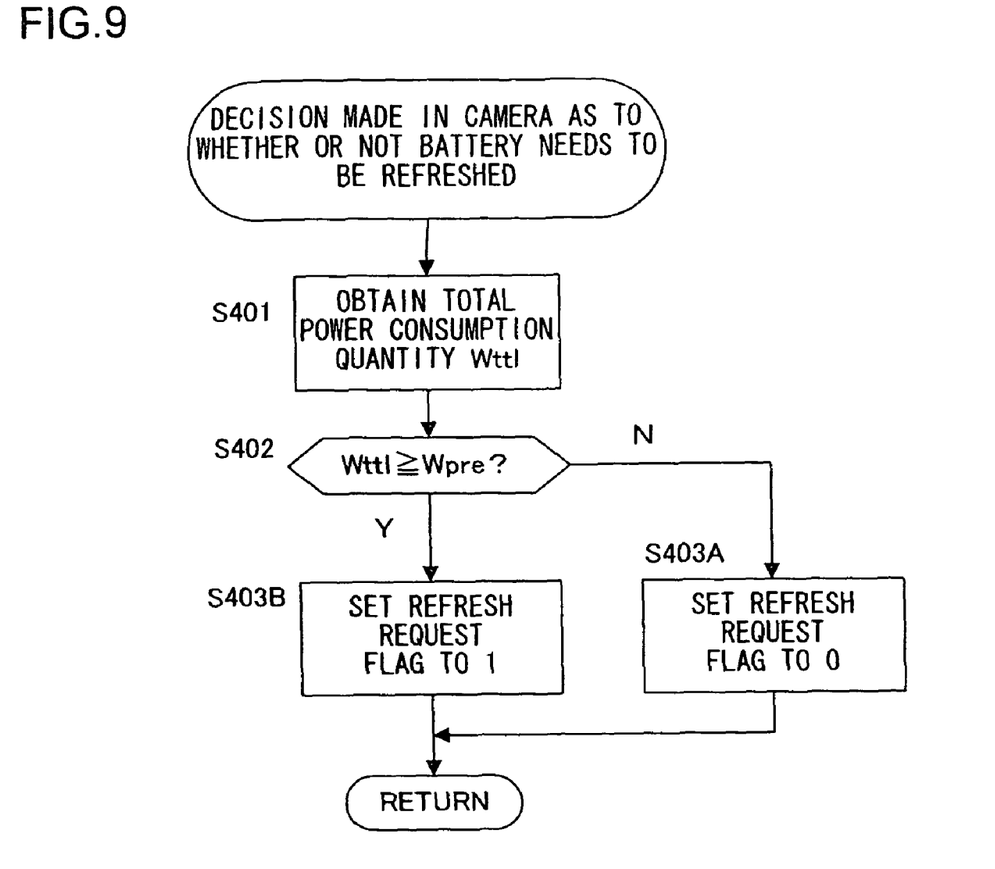
FIG. 9 presents a flowchart of the control procedure executed on the camera side to judge whether or not a refresh operation is necessary.

In such a case, the camera MCU 21 obtains the total power consumption quantity Wtt1 having been calculated at the capacity calculation MCU 14 of the battery 2 in step S401, and then in step S402, the camera MCU 21 compares the total power consumption quantity Wtt1 with the threshold value Wpre, as shown in the flowchart presented in FIG. 9. If Wtt1 is smaller than Wpre, the operation proceeds to step S403A to set the refresh request flag to "0". If, on the other hand, Wtt1 is equal to or greater than Wpre, the operation proceeds to step S403B to set the refresh request flag to "1".

In addition, the discharge current value Inow may be transmitted from the battery 2 to the camera 1 at predetermined sampling intervals. In such a case, the camera 1 is able to calculate the total power consumption quantity Wtt1 based upon the current value and then make a decision as to whether or not a refresh operation is necessary based upon the value of the total power consumption quantity Wtt1.

Figure 10:
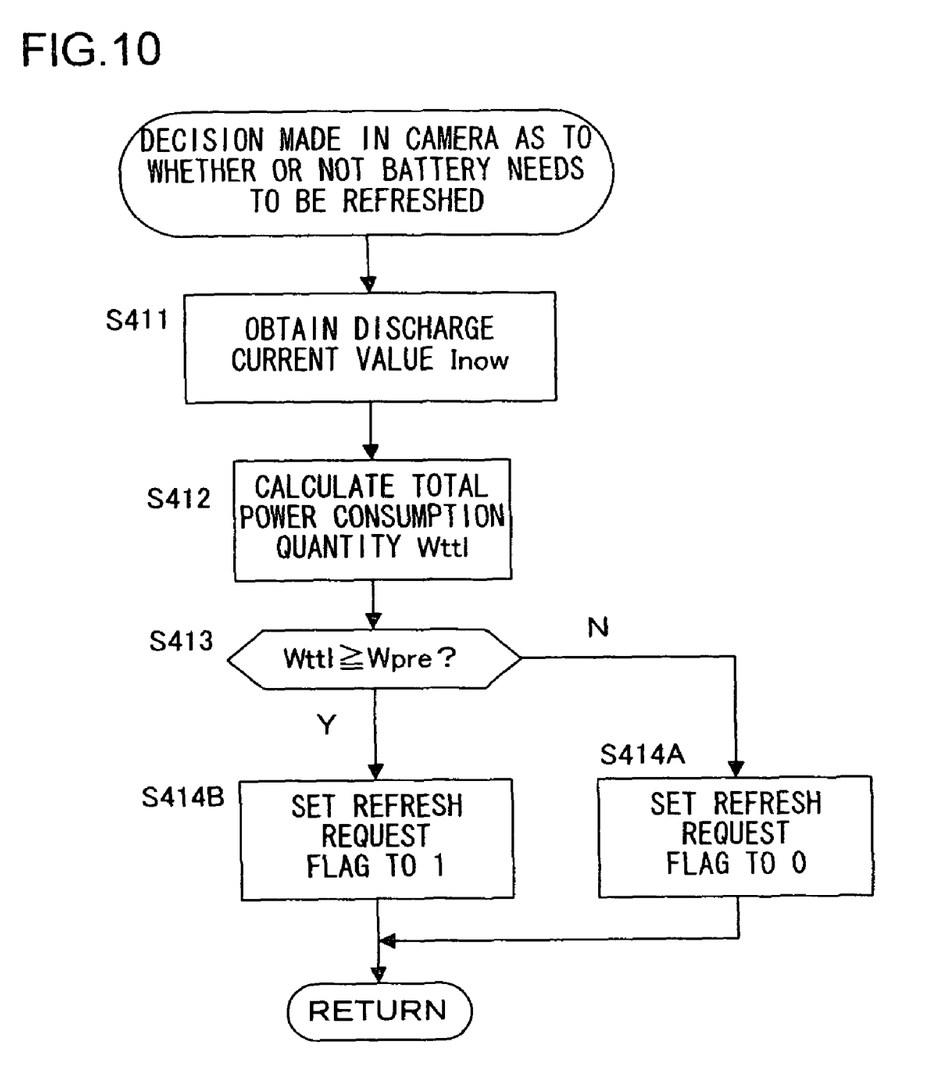
FIG. 10 presents a flowchart of another control procedure that may be executed on the camera side to judge whether or not a refresh operation is required.

This processing may be executed as shown in a flowchart in FIG. 10, in which the camera MCU 21 first obtains the discharge current value Inow transmitted from the battery 2 at the sampling intervals of T in step S411. Then, in step S412, the camera MCU 21 calculates the power consumption quantity Wnow during a sampling interval T as indicated in expression (1) by using the discharge current value Inow and also calculates the total power consumption quantity Wtt1, as indicated in expression (2). In step S413, the total power consumption quantity Wtt1 is compared with the threshold value Wpre. If Wtt1 is smaller than Wpre, the operation proceeds to step S414A to set the refresh request flag to "0", whereas if Wtt1 is equal to or greater than Wpre, the operation proceeds to step S414B to set the refresh request flag to "1".

In this case, by transmitting the total power consumption quantity calculated in the camera to the battery to be stored in the battery on a regular basis and allowing the camera to receive the total power consumption quantity with appropriate timing for an update, the power consumption quantity in each battery can be calculated even when different batteries are used in conjunction with a single camera or a single battery is used for multiple cameras. Alternatively, the total power consumption quantities of a plurality of batteries may be stored in memory in the camera in correspondence to the IDs (the serial numbers) of the individual batteries.

In addition, while the total current consumption quantity is calculated by detecting the discharge current during battery use, the charge quantity may be detected in order to obtain the total current consumption quantity since the battery is charged to an extent corresponding to the extent to which it has been discharged. In the latter case, the charge current value may be detected in the battery at predetermined sampling intervals during the charge operation and then the total power consumption quantity may be calculated through a method similar to the calculation method described earlier.

It is to be noted that the battery is not limited to the type described earlier, as long as it is a secondary battery. Furthermore, the present invention may be adopted equally effectively in a portable electronic device (e.g., a mobile personal computer) other than a camera and in conjunction with the battery loaded into the portable electronic device.

Figure 11:
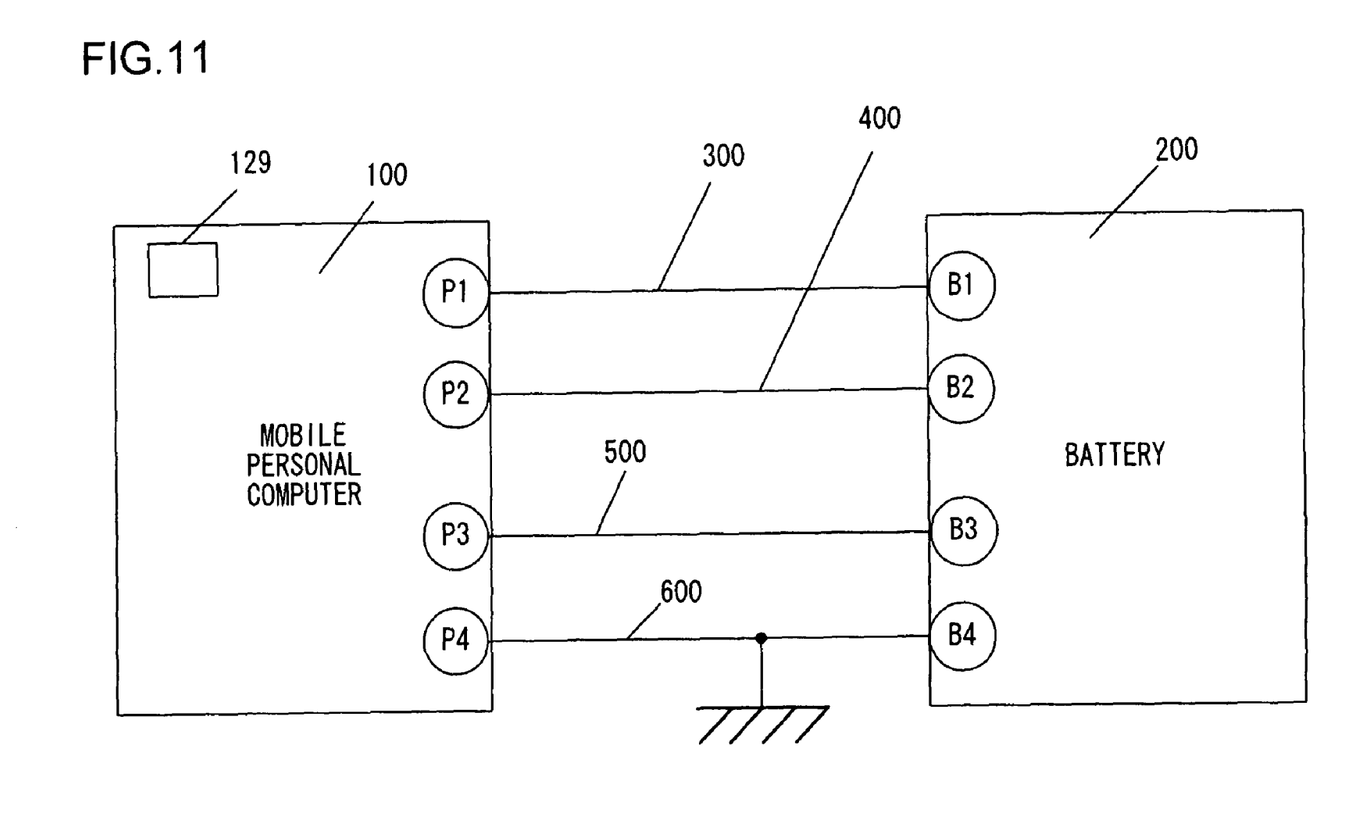
FIG. 11 shows the lines connecting a portable device and a battery.

FIG. 11 shows lines connecting a mobile personal computer 100 to a battery 200 loaded therein. In a manner similar to that with which the camera 1 and the battery 2 loaded therein become connected with each other as explained earlier, terminals P1 through P4 on the mobile personal computer side become electrically connected with terminals B1 through B4 respectively on the battery side. As a result, a communication line 300, a load recognition line 400, a power positive line 500 and a power negative line 600 are established. The mobile personal computer 100 includes an LED 129 that is lit or is made to flash so as to prompt the user to refresh the battery 200. The battery 200 can be recharged and refreshed on a charger (not shown). The processing executed on the mobile personal computer side and the processing executed on the battery side are similar to those described in reference to the embodiment above.

As explained above, the charge current value or the discharge current value is obtained at predetermined sampling intervals, the power consumption quantity representing the extent to which power has been consumed during a sampling interval, i.e., during the period elapsing between two sampling points is calculated based upon the current value, and the total power consumption quantity is determined by sequentially adding the power consumption quantity consumed during each sampling interval corresponding to the period elapsing between the two most recent sampling points. Thus, the total power consumption quantity can be calculated with a high degree of accuracy so as to make an accurate decision with regard to whether or not the battery needs to be refreshed. If it is decided that a refresh operation is necessary, information indicating that the battery needs to be refreshed is provided to the user and since this allows the user to refresh the battery only when it needs to be refreshed, the onus placed on the user is reduced.

The above described embodiment is an example and various modifications can be made without departing from the spirit and scope of invention.

What is claimed is:

1. A battery loaded in a camera, comprising:
   a current detection device;
   an arithmetic operation device that receives one of a charge current value and a discharge current value from the current detection device at predetermined sampling intervals, calculates a power consumption quantity indicating an extent to which power has been consumed during a sampling interval based upon the current value and calculates a total power consumption quantity by sequentially adding the power consumption quantity consumed during each sampling interval, with the total power consumption quantity indicating an extent to which the power has been consumed since a most recent refresh operation of the battery, where a refresh operation includes a discharging operation for eliminating an effect of a battery capacity becoming lower;
   a determination device that determines as to whether the battery needs to be refreshed for eliminating the effect of the battery capacity becoming lower, based upon a comparison of the total power consumption quantity calculated at each sampling interval with a predetermined threshold value;
   a communication device that transmits determination results by the determination device to the camera, and also receives information indicating a completion of a refresh operation for eliminating the effect of the battery capacity becoming lower, after the battery is subjected to the refresh operation; and
   a control device that resets the total power consumption quantity as the information indicating the completion of the refresh operation for eliminating the effect of the battery capacity becoming lower is received by the communication device.

2. A battery according to claim 1, wherein:
the arithmetic operation device sets the sampling interval longer when power to the camera is in an OFF state compared to when the power to the camera is in an ON state.

3. A battery according to claim 1, wherein:
the refresh operation is an operation for discharging the battery completely.

4. A battery, comprising:
a current detection device;
an arithmetic operation device that receives one of a charge current value and a discharge current value from the current detection device at predetermined sampling intervals, calculates a power consumption quantity indicating an extent to which power has been consumed during a sampling interval based upon the current value and calculates a total power consumption quantity by sequentially adding the power consumption quantity consumed during each sampling interval, with the total power consumption quantity indicating an extent to which the power has been consumed since a most recent refresh operation of the battery, where a refresh operation includes a discharging operation for eliminating an effect of a battery capacity becoming lower;
a determination device that determines as to whether the battery needs to be refreshed for eliminating the effect of the battery capacity becoming lower, based upon a comparison of the total power consumption quantity calculated at each sampling interval with a predetermined threshold value;
a communication device that transmits determination results by the determination device to the outside, and also receives information indicating a completion of a refresh operation for eliminating the effect of the battery capacity becoming lower, after the battery is subjected to the refresh operation; and
a control device that resets the total power consumption quantity as the information indicating the completion of the refresh operation for eliminating the effect of the battery capacity becoming lower is received by the communication device.

* * * * *